United States Patent [19]

Mensing et al.

[11] Patent Number: 5,501,117
[45] Date of Patent: Mar. 26, 1996

[54] MOTOR ASSEMBLY WITH GEAR HOUSING CONTAINING PINION GEAR SUPPORT BEARING

[75] Inventors: Norbert Mensing, Bruchsal; Siegfried Kimmich, Kraichtal, both of Germany

[73] Assignee: Sew-Eurodrive GmbH & Co., Bruchsal, Germany

[21] Appl. No.: 216,943

[22] Filed: Mar. 24, 1994

[30] Foreign Application Priority Data

Mar. 24, 1993 [DE] Germany ............................ 43 09 559.3

[51] Int. Cl.$^6$ ................................ F16H 1/12; F16H 57/02
[52] U.S. Cl. ............................. 74/420; 74/421 A; 74/423; 74/606 R
[58] Field of Search .................... 74/412 R, 420, 74/421 A, 423, 606 R

[56] References Cited

U.S. PATENT DOCUMENTS

| | | | |
|---|---|---|---|
| 2,600,912 | 6/1952 | Olson | 74/606 R X |
| 2,918,825 | 12/1959 | Bade | 74/606 R X |
| 3,143,897 | 8/1964 | Kohn | 74/606 R |

Primary Examiner—Allan D. Herrmann
Attorney, Agent, or Firm—Antonelli, Terry, Stout & Kraus

[57] ABSTRACT

The invention is a compact gear drive with a maximum transmission range for a constant crown gear diameter and constant axial displacement. A pinion is mounted on a bearing remote from the crown gear. The pinion is constructed as a hollow shaft and is fictionally connected to a drive shaft of a driving motor.

19 Claims, 4 Drawing Sheets

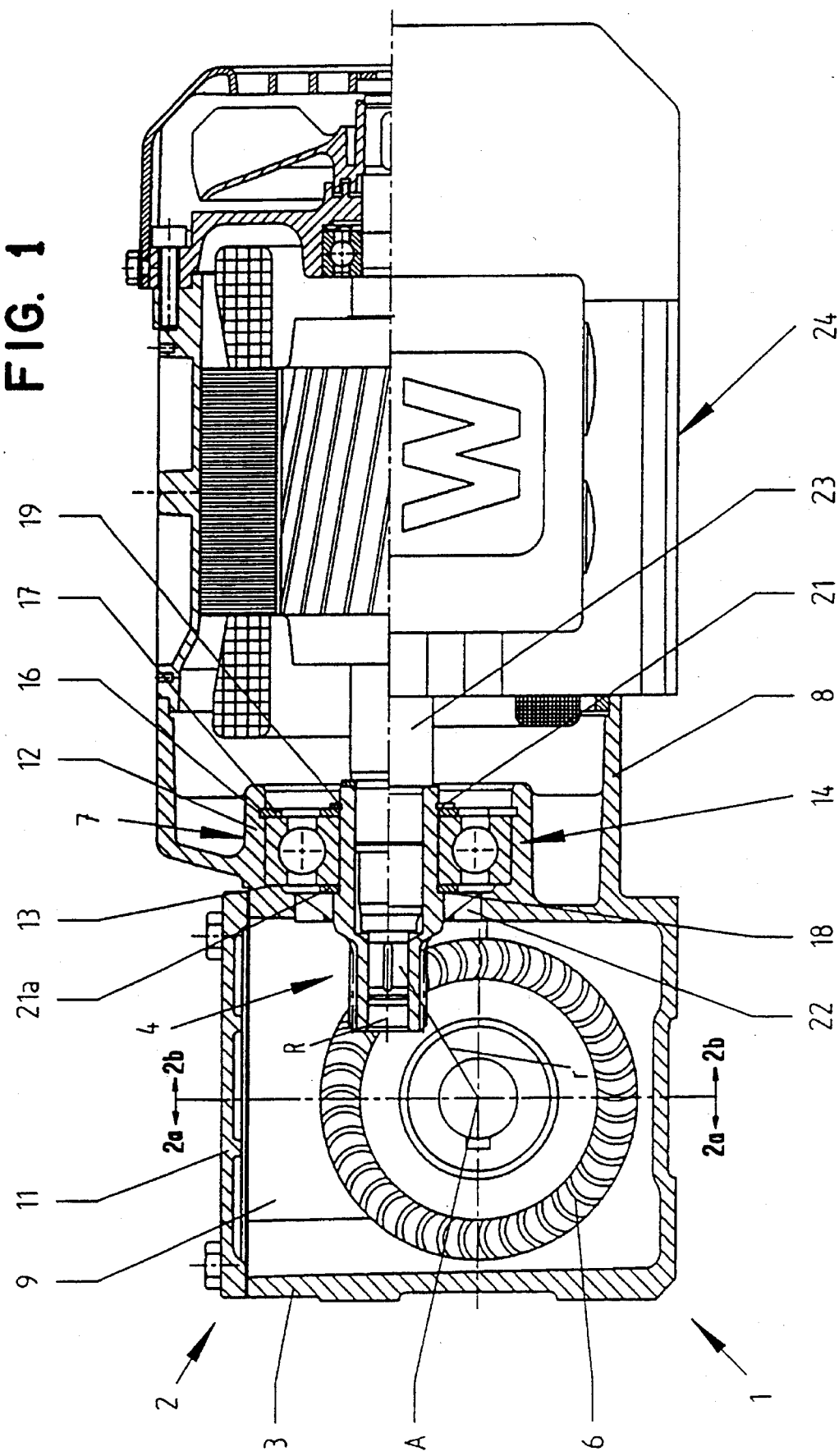

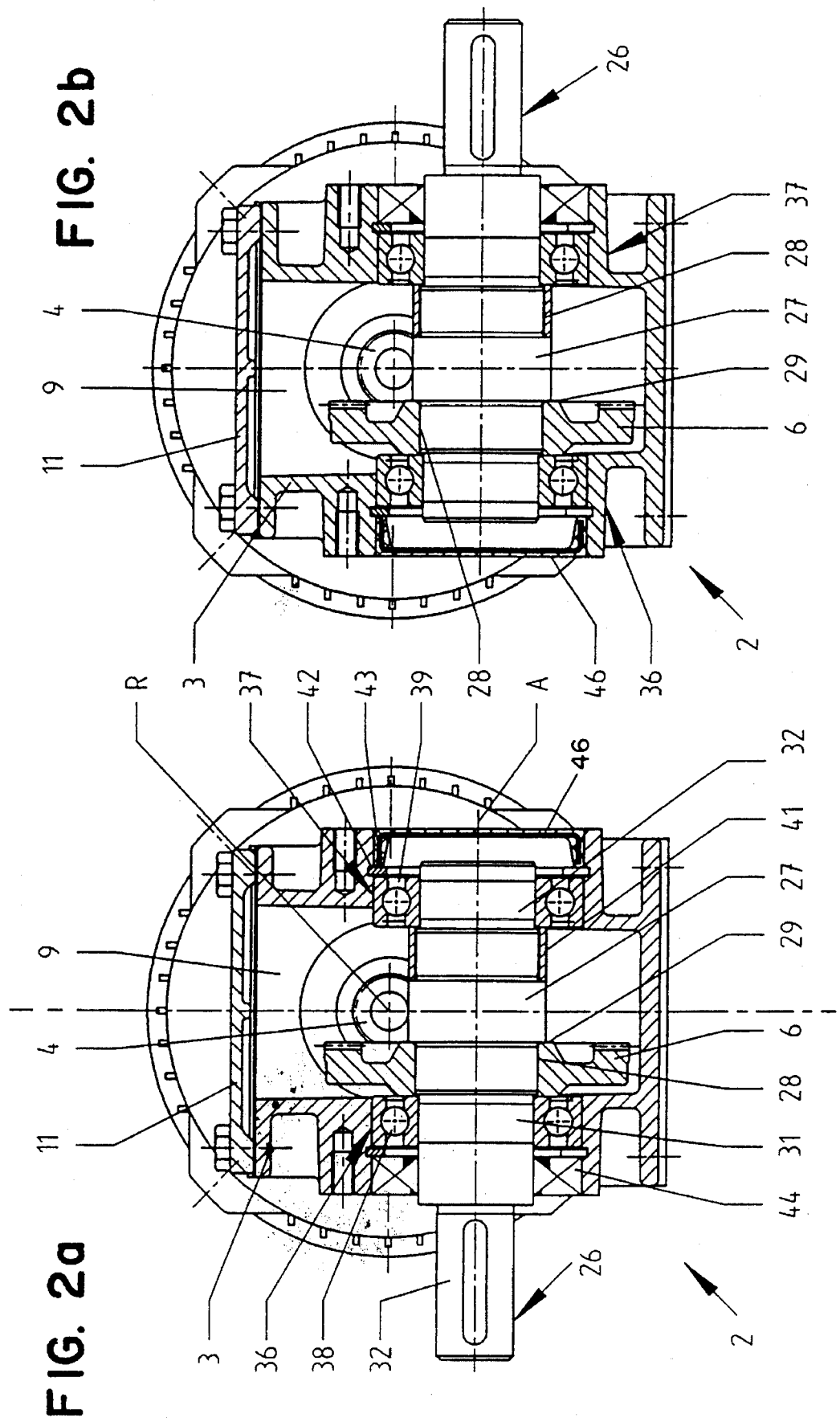

MOTOR ASSEMBLY WITH GEAR HOUSING CONTAINING PINION GEAR SUPPORT BEARING

BACKGROUND OF THE INVENTION

1. Field of the Invention

The invention relates to a bevel gear with a large axial displacement having a toothed wheel on the power take-off side provided on one face with a tooth system and having a pinion engaging therewith.

2. Description of the Prior Art

In general, axially displaced bevel gears are constructed as worm gears and geared motors as worm geared motors (for a constant wheel diameter and transmission ratio of I>8. The pinion constructed as a worm must be mounted on either side of the worm gear housing for stability reasons. In the case of conventional worm geared motors the motor shaft has in the crankshaft housing a two-sided mounting, which is complicated and costly.

SUMMARY OF THE INVENTION

While avoiding the aforementioned disadvantages, the problem solved by the invention is to provide a crown gear, which in the case of a compact design involves limited constructional expenditure, permits the fitting of a motor with only a single mounting support and in one housing and for a constant crown wheel diameter permits wide transmission ranges of I=8 to 300, without it being necessary to have different housing contours and geometries for the different transmission ratios.

According to the invention this problem is solved by a crown gear with a large axial displacement having a toothed wheel on the power take-off side provided on one face with a tooth system and having a pinion engaging thereon and which is characterized in that the pinion is only mounted at a bearing point remote from the toothed wheel and that the pinion is constructed as a hollow shaft and is frictionally connectable in a non-rotary manner to a main shaft of a driving motor.

The invention provides a compact crown gear, in that it functions with a large axial displacement between the toothed wheel axis and the pinion axis, the ratio between the crown wheel diameter and the axial displacement generally being between 2.5 and 5. For solving the set problem it is also provided that the pinion is only mounted on one side, namely at a bearing point remote from the toothed wheel, as opposed to worm gears where, as stated, two bearing points are necessary. For the easy connection of the pinion to the motor, it is constructed as a hollow shaft, so that the driven shaft of the motor is inserted in the hollow shaft of the pinion and can be connected frictionally thereto in non-rotary manner. Buckling movements of the pinion and main shaft are counteracted in that the tolerances are small and the main shaft is positively surrounded by the pinion.

According to a preferred development, the pinion is mounted in a bearing bracket fittable to the motor and in particular the bearing bracket is connected in one piece to a housing of the gear, so that there is no need for a separate bearing bracket on the motor.

According to further developments in accordance with the invention, the passage of the pinion to the gear interior is sealed by a radial shaft packing, a bearing for the pinion is positively mounted in the gear housing and/or a bearing for the pinion is axially held in the gear housing between a housing shoulder facing the toothed wheel and an opening-side snap ring inserted in a groove in the housing.

A preferred further development is characterized in that the pinion is held in an axially fixed manner in the bearing. It can also be provided that on the gear side the pinion is axially held by means of a shoulder, optionally accompanied by the interposing of a supporting disk, and on the motor side by means of a groove formed therein and a snap ring inserted therein and in particular a supporting disk is placed between the bearing and the snap ring.

According to further embodiment of the invention, the mounting supports in the direction of the toothed wheel axis are constructed symmetrically at right angles to the pinion axis and in the housing in the direction of the toothed wheel axis and symmetrically at right angles to the pinion axis there are bearing points for bearings for the mounting of a shaft for the toothed wheel. In particular in the direction of the toothed wheel axis and symmetrically to the pinion axis there are grooves in bearing rings for bearings for the driven shaft for the axial fixing of the bearings for the shaft by means of snap rings.

According to a further embodiment of the invention crown gear the shaft is constructed in stepped manner with the largest diameter being in a central part in the vicinity of the pinion axis. In particular the crown gear is axially held on a reduced diameter support area between a shoulder of the shaft and a bearing and/or when a flange is provided the shaft is mounted on one side in the flange.

A geared motor according to the invention with a crown gear according to the invention and an electric motor is characterized in that the motor only has one motor bearing and in particular the single motor bearing is located on the side remote from the driven shaft.

Thus, according to the invention a crown gear or a geared motor with such a crown gear is provided and the latter is preferably provided with an integrated bearing bracket for the motor. The gear casing can be provided on the top (which is traversed by none of the axes of the rotary parts) and can be provided with an assembly opening, which can be closed by a cover.

An important advantage of the gear according to the invention is that the tooth material both for the pinion and for the toothed wheel can be steel, so there is no need to in part use bronze.

The pinion of the crown gear according to the invention is designed in such a way that on the one hand it brings about the sealing of the gear interior with respect to the motor and on the other, as explained, provides the further mounting of the main shaft, so that the latter need only be mounted at one point in the motor housing. The sealing and frictional connection takes place by bonding the pinion to the main shaft. In addition, a radial shaft packing ring can be provided between the pinion and the gear housing.

The crown gear is preferably also fixed by an adhesive-bonded joint to its shaft and this ensures the power transmission. An important advantage of the invention is that simple assembly is possible, because the clearance can optionally be brought about by means of shims around the crown gear shaft between the crown gear and a fixed abutment (snap ring) for the same.

The invention permits different constructions of the housing, namely with and without a flange, shaft end to the right and left, using a hollow shaft and combinations thereof.

In all cases the same crown wheel can be used for a given transmission, because in the case of the crown gear according to the invention the tooth system is not of a trivial nature and it is therefore advantageous if for the very varied use possibilities the minimum number of movable gear parts (crown gear, pinion) are required.

BRIEF DESCRIPTION OF THE DRAWINGS

Further advantages and features of the invention can be gathered from the claims and the following description of embodiments of the crown gear according to the invention and with reference to the drawings, wherein:

FIG. 1 shows a geared motor with an axially displaced crown gear according to the invention, partly in section.

FIGS. 2a and 2b respectively show a section along lines 2a–2b of FIG. 1 in the case of a crown gear without a flange.

DESCRIPTION OF THE PREFERRED EMBODIMENT

Figure 3B:
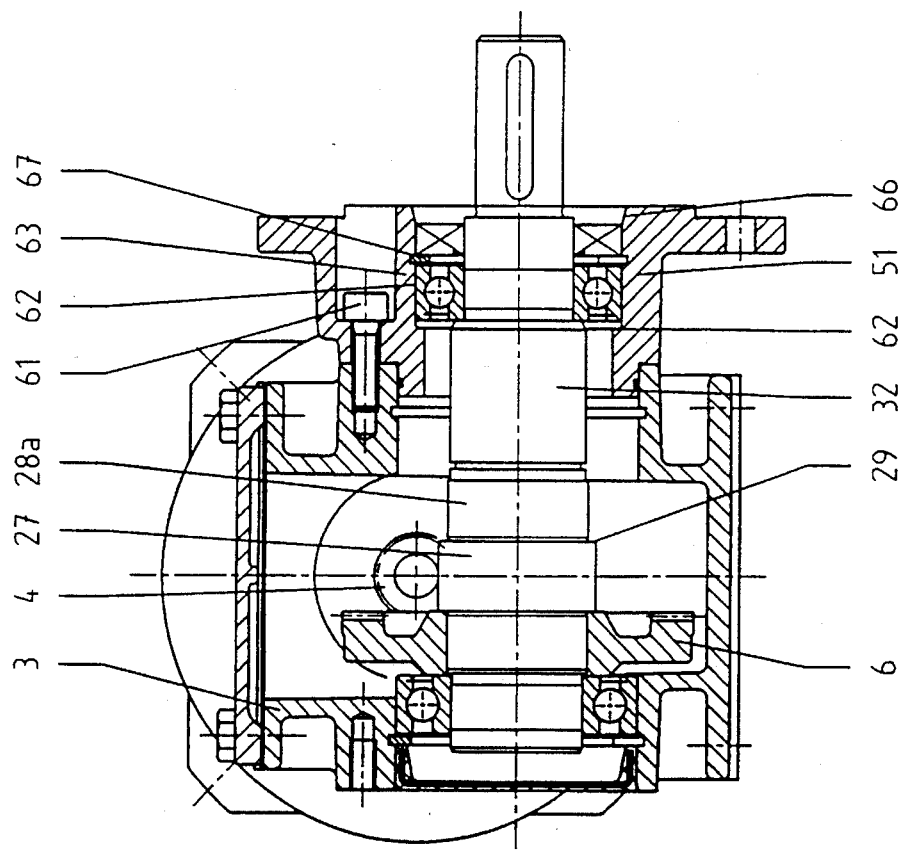
FIGS. 3a and b show sectional views similar to FIG. 2 in the case of a crown gear with a flange added on the power take-off side.

The geared motor 1 shown in FIG. 1 has a crown gear 2 with a large axial displacement. The gear housing 3 has pinion 4 on the drive side and a crown gear 6 on the power take-off side in the form of a radially serrated crown wheel.

In the represented embodiment the axial displacement of the axis A of the crown gear 6 and the axis R of the pinion 4 with respect to the diameter of the crown gear 6 is approximately ¼, so that the axis R of the pinion 4 and a radius r of the crown gear 6 form an angle of approximately 45° with respect to the application point of the pinion 4 thereto.

This axial displacement is of an optimum nature. However, different, large axial displacements can be chosen, without the axial displacement representing half the diameter of the crown gear 6, i.e., the crown gear according to the invention is not a worm gear. Preferably the axial displacement is between 2/10 and 4/10 of the crown gear diameter.

The gear housing 3 has a motor-side mounting support 7 for the pinion 4. In the represented embodiment the mounting support 7 is constructed in a motor-side bearing bracket 8, which is here constructed in one piece on the gear housing.

The gear housing 3 is provided on a top surface which is not traversed by the axes A and R with an assembly opening 9, which is closable by a closure part 11.

The mounting support 7 has a bearing ring 12, on which on the gear side is connected an inwardly directed shoulder 13. In the mounting support 7, within the bearing ring 12, is positioned a (ball) bearing 14 for the pinion 7. The bearing is axially secured in the bearing ring 12 between the shoulder 13 and a snap ring 17 (circlip) inserted in a groove 16 of the ring 12.

The pinion 4 is constructed as a hollow pinion. It is axially held in the bearing 14 by means of a shoulder 18 constructed thereon and a snap ring engaging in a groove 19 of the pinion 4, accompanied by the interposing of in each case one supporting disk 21, 21a. Towards the interior of the housing 3, it is sealed by a radial shaft packing ring 22.

A main shaft 23 of an electric motor 24 of the geared motor 1 engages in the interior of the pinion 4. The main shaft 23 is frictionally connected to the pinion 4 by a bonded joint, e.g. using Loctite or some similar, suitable adhesive.

The main shaft 23 is also mounted in the electric motor 24 solely on the gear-remote side by means of a conventionally designed, per se known bearing, without there being a further bearing in the electric motor. The mounting by the bearing 14 is completely adequate both for the main shaft 23 and also for the pinion 4 engaging positively therein on one side and therefore positively with respect to buckling movements and frictionally for transferring the rotary movement in the described manner.

FIGS. 2a and b show a section along line 2a–2a and 2b–2b respectively in FIG. 1 in the case of a crown gear 6 without a flange and having a solid driven shaft 26. The comparison of FIGS. 2a and 2b shows that a right and left-side power take-off can be obtained by a corresponding arrangement of the shaft 26, the crown gear 6 being located at the same point in the housing.

This is achieved in that the shaft 26 has a stepped construction and is namely symmetrical over part of its length. It has a maximum diameter central part 27 symmetrical in installation with respect to the axis R of the pinion 4 and on which on both sides are connected randomly usable support areas 28 for the crown gear 6 having a reduced diameter, so that between the central part 27 and the support areas 28 a shoulder 29 is formed, which optionally serves to engage the crown gear 6. To the support areas 28 are connected on either side further diameter-reduced bearing portions 31, 32, whose diameter and length are identical. Subsequently the mirror symmetry is not continued, because to a bearing portion 31 are connected the shaft packing seat and a shaft end 32, to which are connectable the shafts of the equipment to be driven by the geared motor 1.

In the direction of the axis A of the toothed wheel 6 are constructed in the gear housing 3 symmetrically to the axis R of the pinion 4 bearing areas 36, 37 for the shaft 26, in which are arranged (ball) bearings 38, 39, which are axially retained on the one hand by a spacing sleeve 41 and the crown gear 6 and on the other on their side remote from the pinion 4 or the crown gear 6 by snap rings 43 (circlips) located in the grooves 42 of the housing 3.

On the side facing the shaft end 32 is provided between the housing 3 and the shaft 26 in the vicinity of the extended bearing portion 31 a radial shaft packing 44 for sealing purposes, whereas on the opposite side the opening is sealed by a tightly fitted cover 46.

Figure 3A:
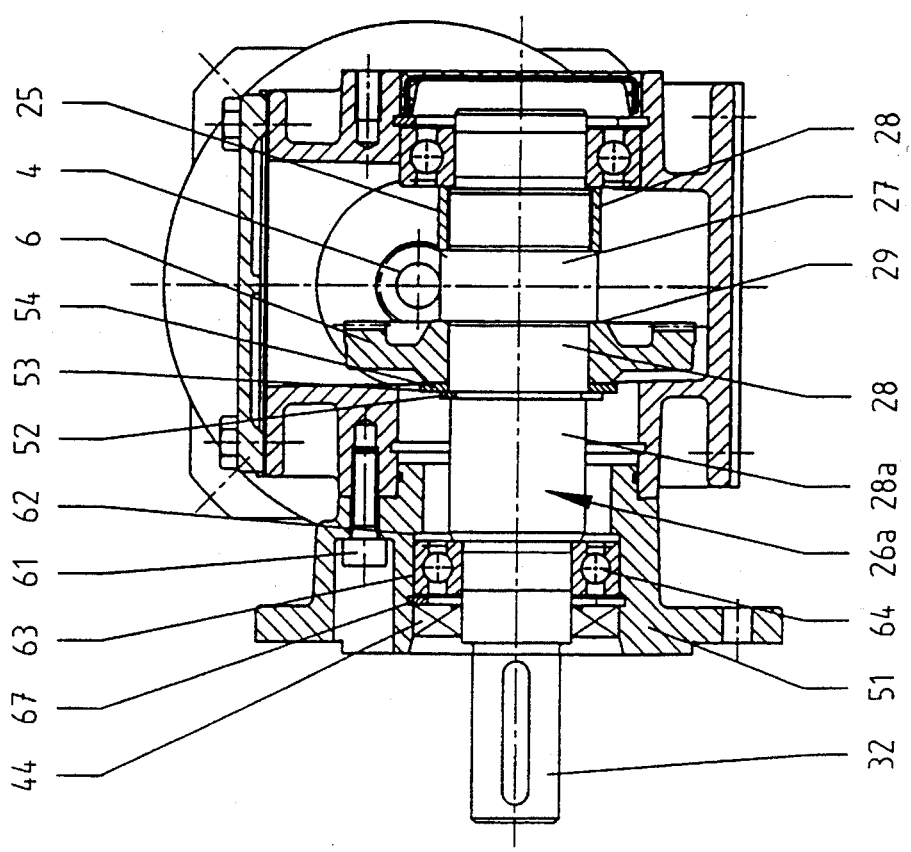

FIGS. 3a and 3b show a basically similar construction to FIGS. 2a and 2b, only the design of FIGS. 3a and 3b is not flangeless, but instead has a flange 51 for fixing or connecting to the apparatus to be driven, the flange 51 simultaneously serving for the mounting of the shaft 26a.

Here again a two-sided construction is possible. Reference should be made to the explanation of FIGS. 2a and 2b of features common to FIGS. 2a, 2b and 3a and 3b in order to avoid unnecessary repetition.

The flange 51, which is identically constructed in both FIGS. 3a and 3b, is fixed by means of screws 61 to the housing 3. The flange 51 is internally provided with a stepped bearing ring 63 for a bearing 64 of the shaft 26a, which is axially retained between the shoulder and a snap ring 67 inserted in a ring flange 66 of the flange 51 and to which is externally connected the radial shaft packing 44.

Figure 4B:
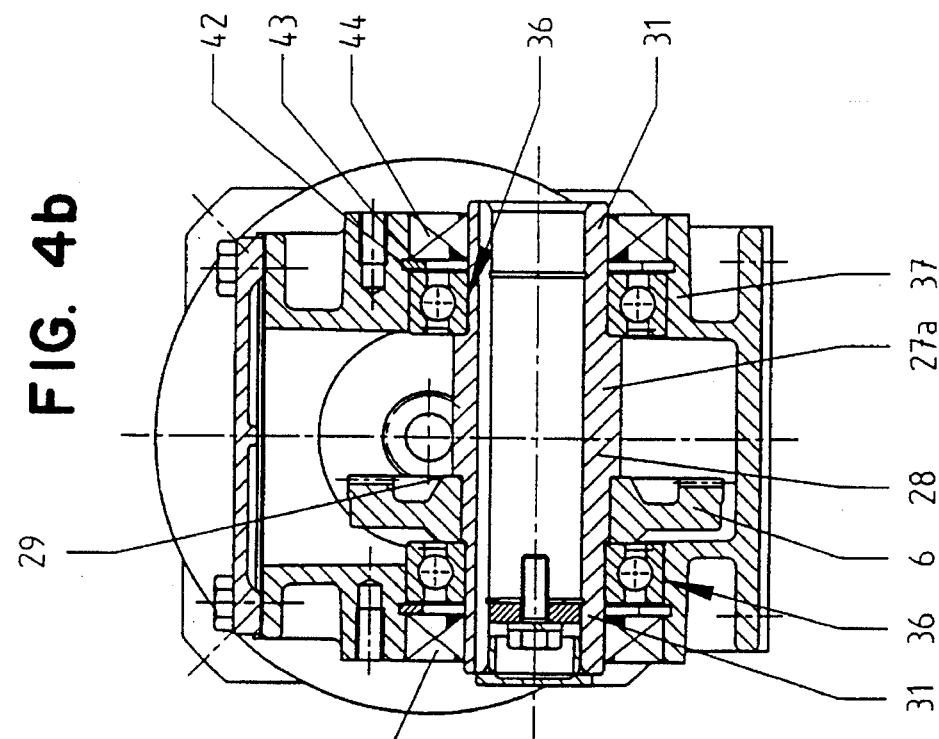
FIGS. 4a and b show a sectional view similar to FIGS. 2a and 2b with a hollow shaft supporting the crown gear with (FIG. 4a) and without (FIG. 4b) a flange.
Figure 4A:
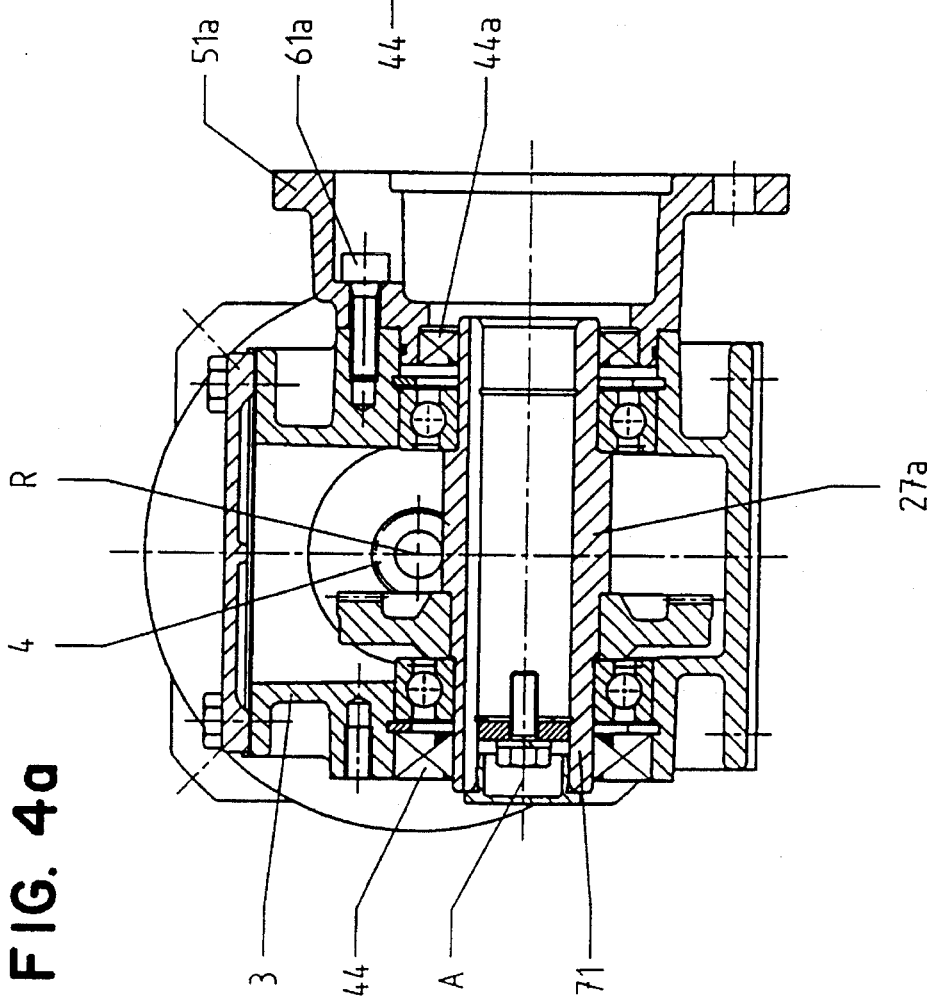

The constructions of FIGS. 4a and 4b differ from those of FIGS. 2a/b and 3a/b through the provision of a hollow shaft 71, which is symmetrically constructed in its interior in the extension direction of its axis A to the axis R of the pinion 4. Therefore it does not have to be rotated independently of the connection of the equipment to be driven, as is the case with the shaft 26, 26a, so that a symmetrical construction starting from the central part 27a is not necessary and consequently the different diameter sections of shaft 26 of FIGS. 2a to 3b are not required.

Otherwise the mounting of the shaft 71 takes place in the same way as the shaft 26 of FIGS. 2a and 2b, so that reference should be made to the description in connection therewith. In accordance with the construction of the shaft as a hollow shaft 71, two radial ring shaft packings 44, 44a are provided on both sides.

In the construction of FIG. 4a a bearing flange 51a is fixed to the housing 3 by several screws 61a for connection to the equipment to be driven.

We claim:

1. A motor assembly comprising:
   a motor having a drive shaft which rotates during activation of the motor;
   a gear housing attached to the motor;
   a gear and a pinion meshing with the gear, the gear and the pinion being located within the gear housing with the gear driving a power takeoff; and
   a bearing, mounted in the gear housing at a position displaced from the toothed gear, for rotatably supporting rotation of the pinion during activation of the motor; and wherein
   the pinion has a hollow shaft with the hollow shaft engaging an outside surface of the drive shaft for directly driving the pinion.

2. A motor assembly in accordance with claim 1 further comprising:
   a radial shaft packing mounted in the gear housing concentric with the pinion and outboard from the bearing.

3. A motor assembly in accordance with claim 1 further comprising:
   a shoulder in the gear housing;
   an interior groove in the gear housing; and
   a snap ring inserted in the groove; and wherein
   the bearing is axially retained in the gear housing between the shoulder and the snap ring.

4. A motor assembly in accordance with claim 1 wherein:
   the pinion is retained axially in the bearing by a retaining mechanism.

5. A motor assembly in accordance with claim 3 wherein the retaining mechanism comprises:
   a shoulder in the pinion which prevents the bearing from moving axially past the shoulder;
   a groove formed in the pinion; and
   a snap ring retained in the groove which prevents the bearing from moving axially past the snap ring.

6. A motor assembly in accordance with claim 5 wherein the retaining mechanism further comprises:
   a supporting disk disposed between the shoulder and the bearing.

7. A motor assembly in accordance with claim 1 wherein:
   the gear housing is symmetrical with reference to an axis of rotation of the gear with the axis of rotation of the gear being orthogonal to an axis of rotation of the pinion.

8. A motor assembly in accordance with claim 1 further comprising:
   a pair of bearings for rotatably supporting a shaft attached to the toothed gear with the bearings being located symmetrically in the gear housing relative to the axis of rotation of the pinion.

9. A motor assembly in accordance with claim 8 further comprising:
   a pair of grooves in the bearing housing, a first of the pair of grooves being outboard of one of the pair of bearings for rotatably supporting the shaft attached to the gear and a second of the pair of grooves being outboard of another one of the pair of bearings for rotatably supporting the shaft attached to the gear; and
   a pair of snap rings for retaining the pair of bearings one of the pair of snap rings being retained in the first of the pair of grooves and another one of the pair of snap rings being retained in the second of the pair of grooves.

10. A motor assembly in accordance with claim 1:
    a flange for retaining a bearing which rotatably supports a shaft driven by the gear; and
    fasteners attaching the flange to the gear housing.

11. A motor assembly in accordance with claim 1 further comprising:
    a shaft driven by the gear, the shaft having at least two different steps each having a different diameter, a largest diameter of the shaft being adjacent to an axis of rotation of the pinion.

12. A motor assembly in accordance with claim 1 further comprising:
    a shaft having the gear mounted on a support area of the shaft, a shoulder having a diameter larger than a diameter of the support area retaining the gear against axial movement in a first axial direction and a bearing rotatably supporting the shaft for rotation in the housing and retaining the gear against axial movement in a second axial direction opposite the first axial direction.

13. A motor assembly in accordance with claim 1 further comprising:
    only one other bearing rotatably supporting the drive shaft, the one other bearing being mounted at an end of the motor opposite an end of the motor nearest the gear housing and the bearing.

14. A motor assembly in accordance with claim 1 wherein:
    the gear is a crown gear and a ratio between a diameter of the gear and an axial displacement between the pinion axis is between 2.5 and 5.

15. A motor assembly in accordance with claim 2 wherein:
    the gear is a crown gear and a ratio between a diameter of the gear and an axial displacement between the pinion axis is between 2.5 and 5.

16. A motor assembly in accordance with claim 3 wherein:
    the gear is a crown gear and a ratio between a diameter of the gear and an axial displacement between the pinion axis is between 2.5 and 5.

17. A motor assembly in accordance with claim 4 wherein:

the gear is a crown gear and a ratio between a diameter of the gear and an axial displacement between the pinion axis is between 2.5 and 5.

18. A motor assembly in accordance with claim 14 wherein:

the gear is a crown gear and a ratio between a diameter of the gear and an axial displacement between the pinion axis is between 2.5 and 5.

19. A motor assembly comprising:

a motor having a drive shaft which rotates during activation of the motor;

a gear housing attached to the motor;

a gear and a pinion meshing with the gear, the gear and the pinion being located within the gear housing with the gear driving a power takeoff;

only one bearing, mounted in the gear housing at a position displaced from the gear, for rotatably supporting rotation of the pinion during activation of the motor;

only one other bearing displaced axially along the motor from the only one bearing which rotatably supports the drive shaft; and wherein the pinion has a hollow shaft with the hollow shaft engaging an outside surface of the drive shaft for directly driving the pinion.

* * * * *